United States Patent
Asari et al.

(10) Patent No.: US 7,362,910 B2
(45) Date of Patent: Apr. 22, 2008

(54) COLOR IMAGE CHARACTERIZATION, ENHANCEMENT AND BALANCING PROCESS

(75) Inventors: Vijayan K. Asari, Virginia Beach, VA (US); Ming-Jung Seow, Williamsburg, VA (US)

(73) Assignee: Old Dominion University Research Foundation, Norfolk, VA (US)

( * ) Notice: Subject to any disclaimer, the term of this patent is extended or adjusted under 35 U.S.C. 154(b) by 300 days.

(21) Appl. No.: 11/040,123

(22) Filed: Jan. 21, 2005

(65) Prior Publication Data
US 2005/0163392 A1     Jul. 28, 2005

Related U.S. Application Data

(60) Provisional application No. 60/538,998, filed on Jan. 23, 2004.

(51) Int. Cl.
*G06K 9/40* (2006.01)
(52) U.S. Cl. .................... 382/254; 382/162
(58) Field of Classification Search ........ 382/162, 382/167, 254, 274; 358/518; 345/589, 600, 345/601–605
See application file for complete search history.

(56) References Cited

U.S. PATENT DOCUMENTS

| | | | |
|---|---|---|---|
| 5,991,456 A * | 11/1999 | Rahman et al. | 382/254 |
| 6,507,667 B1 * | 1/2003 | Hsieh et al. | 382/167 |
| 6,580,835 B1 * | 6/2003 | Gallagher et al. | 382/274 |
| 6,788,822 B1 * | 9/2004 | Zhang et al. | 382/254 |
| 6,834,125 B2 * | 12/2004 | Woodell et al. | 382/274 |
| 6,985,637 B1 * | 1/2006 | Gindele | 382/274 |
| 7,170,645 B2 * | 1/2007 | Kim et al. | 358/3.27 |
| 2004/0114795 A1 * | 6/2004 | Lu et al. | 382/162 |

OTHER PUBLICATIONS

Williams, et al. (Image Enhancement Using The Modified Cosine Function AND Semi-Histogram Equalization For Gray-Scale And Color Images), IEEE, pp. 518-523, 2001.*

* cited by examiner

*Primary Examiner*—Daniel Mariam
(74) *Attorney, Agent, or Firm*—Williams Mullen; M. Bruce Harper

(57) ABSTRACT

A method of characterizing and enhancing the pixels in an image, which is captured at all lighting conditions. The method enable dynamically enhancement of images captured at extremely low lighting conditions. Each pixel of the image, represented by I SUB (x, y) where x is the horizontal axis coordinate value and y is the vertical axis coordinate value, contains three color-components. Each pixel is characterized by defining a relationship between the three color-components of that pixel in its initial state. A nonlinear expansion function, which adaptively adjusts the expansion rate with respect to the statistical property of the original image, is used for enhancing the brightness of the image so that the poorly lighted pixels are enhanced in intensity more as compared to the amount of enhancement for the brighter pixels. The color property of each pixel in the enhanced image is then restored using the characteristic features previously defined by the relationship of the color components. This procedure provides an enhanced image, which is natural in its appearance and has sharp visibility to human observation. In addition, this new technique is fast enough to provide a real time enhancement of images from a video stream.

13 Claims, 8 Drawing Sheets

Input image

Enhanced image input image enhanced image

COLOR IMAGE CHARACTERIZATION, ENHANCEMENT AND BALANCING PROCESS

CROSS REFERENCE TO RELATED APPLICATIONS

The present application claims priority from U.S. Provisional Application Ser. No. 60/538,998, filed Jan. 23, 2004.

BACKGROUND OF THE INVENTION

1. Field of the Invention

The invention relates to digital image enhancement process and more particularly to a process for color image characterization, enhancement, and balancing.

2. Description of Related Art

Electronic cameras based upon CCD detector arrays are quite capable of acquiring image data across a wide dynamic range on the order to 2500:1. This range is suitable for handling most illumination variations within scenes and lens aperture changes are usually employed to encompass scene-to-scene illumination variations. Typically though, this dynamic range is lost when the image is digitized or when the much narrower dynamic range of print and display media are encountered. For example, most images are digitized to 8-bits/color band (256 gray levels/color band). Therefore, the images captured and displayed by photographic and electronic cameras suffer from a comparative loss of detail and color in shadowed zones. This is known as the dynamic range problem. One of the abilities of the human visual system is to steadily perceive a scene regardless of the changes in lighting conditions.

Previous patents in this field include U.S. Pat. No. 6,580,835 to Gallagher which improves digital images by performing a normalized tone scale conversion based on a central pixel of the image.

U.S. Pat. No. 5,991,456 to Rahman et al. describes a method for improving a digital image which calculates the image intensity at specified positions and adjusts the image intensity according to a mathematical equation.

U.S. Pat. No. 5,640,469 to Lewins et al. describes a method for improving images obtained from infrared or x-ray systems which do not obtain the image using visible light. The method improves the intensity equalization of the obtained image data.

An object of the present invention is to provide a method for enhancing digital images.

Another object of the present invention is to provide a method for enhancing digital images captured in complex background and lighting environments.

Another object of the present invention is to provide a method for enhancing digital images which models the human visual system using a ratio rule learning algorithm.

Another object of the present invention is to provide a method for enhancing digital images which is a neural network concept and in which the enhancement is done mainly by processing an individual pixel of an image and does not rely heavily on information of neighboring pixels.

Yet another object of the present invention is to provide a method for enhancing digital images in which the recurrent neural network learns based on the degree of similarity between the relative magnitudes of the output of each neuron with respect to that of all the other neurons.

Finally, it is an object of the present invention to accomplish the foregoing objectives in a simple and cost effective manner.

SUMMARY OF THE INVENTION

The present invention addresses these needs by providing a method for improving a digital image. The relationship between the red, green and blue components of all or a portion of the digital image is characterized. The image is then enhanced by increasing the intensity of darker pixels to a greater extent than lighter pixels. The image is then balanced based on the previously obtained characterization of the relationship between the red, green and blue components of the pixels of the digital image.

BRIEF DESCRIPTION OF THE DRAWINGS

A more complete description of the subject matter of the present invention and the advantages thereof, can be achieved by the reference to the following detailed description by which reference is made to the accompanying drawings in which.

Figure 1:
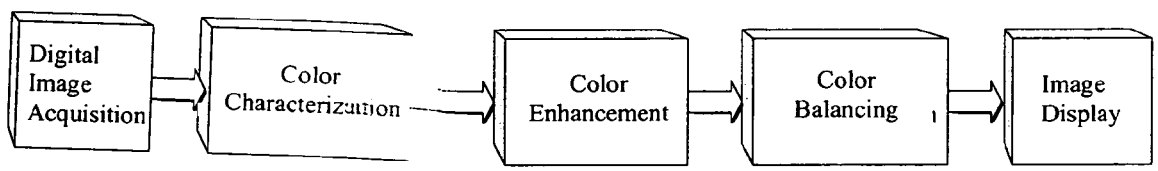
FIG. 1 is a schematic view of the system in which the novel image processing process is carried out. The process consists of acquiring an image from a device, characterize the color, enhance the color, balance the color, and finally, display the enhanced image.

Equations:

$$W = \begin{pmatrix} w_{11} & w_{12} & w_{13} \\ w_{21} & w_{22} & w_{23} \\ w_{31} & w_{32} & w_{33} \end{pmatrix} \quad (1)$$

where $w_{ij}$ is the relationship between the $i^{th}$ color component with respect to the $j^{th}$ color component.

$$R_{(x,y)}(1) = T_R[R_{(x,y)}(0)] \quad (2a)$$

$$G_{(x,y)}(1) = T_G[G_{(x,y)}(0)] \quad (2b)$$

$$B_{(x,y)}(1) = T_B[B_{(x,y)}(0)] \quad (2c)$$

or $$I_{(x,y)}(1) = T[I_{x,y}(0)] \quad (2)$$

where $R_{(x,y)}(0)$ is the red component of the $x^{th}$ row $y^{th}$ column at the $0^{th}$ iteration. $G_{(x,y)}(0)$ is the green component of the $x^{th}$ row $y^{th}$ column at the $0^{th}$ iteration. $B_{(x,y)}(0)$ is the blue component of the $x^{th}$ row $y^{th}$ column at the $0^{th}$ iteration. $T_R[.]$ is the transfer function of the red component. $T_G[.]$ is the transfer function of the green component. $T_B[.]$ is the transfer function of the blue component. $R_{(x,y)}(1)$ is the red component of the $x^{th}$ row $y^{th}$ column after the first iteration. $G_{(x,y)}(1)$ is the green component of the $x^{th}$ row $y^{th}$ column after the first iteration. $B_{(x,y)}(1)$ is the blue component of the $x^{th}$ row $y^{th}$ column after the first iteration.

$$I_{x,y}(t+1) = \frac{W \times I_{x,y}(t)}{2} \text{ for } 1 \leq t < \infty \quad (3)$$

where the current color intensity I at $x^{th}$ row $y^{th}$ column at $(t+1)^{th}$ iteration is depending on the previous color intensity I at $x^{th}$ row $y^{th}$ column at $t^{th}$ iteration multiplied by the weight divided by two.

$$w_{ij} = f(i,j) \quad (4)$$

where i is one color component and j is the other color component.

$$W = \begin{pmatrix} 0 & \frac{R_{x,y}(0)}{G_{x,y}(0)} & \frac{R_{x,y}(0)}{B_{x,y}(0)} \\ \frac{G_{x,y}(0)}{R_{x,y}(0)} & 0 & \frac{G_{x,y}(0)}{B_{x,y}(0)} \\ \frac{B_{x,y}(0)}{R_{x,y}(0)} & \frac{B_{x,y}(0)}{G_{x,y}(0)} & 0 \end{pmatrix} \quad (5)$$

$$I_{x,y}(1) = \frac{k_1}{3} \sum_{i=1}^{3} \left[ \frac{k_2}{1 + \exp\left(-2k_3 \frac{I_{x,y}(0)}{I\_slope_{(x,y)}^i}\right)} + k_4 \right] \quad (6)$$

where $k_1$, $k_2$, $k_3$, $k_4$ are constants.

$$R_{(x,y)}(1) = \frac{255}{3} \sum_{i=1}^{3} \frac{\left[\frac{2}{1+\exp\left(-2\times\frac{R_{(x,y)}(0)}{R\_slope_{(x,y)}^i}\right)} - 1\right]}{\left[\frac{2}{1+\exp\left(-2\times\frac{255}{R\_slope_{(x,y)}^i}\right)} - 1\right]} \quad (7a)$$

$$G_{(x,y)}(1) = \frac{255}{3} \sum_{i=1}^{3} \frac{\left[\frac{2}{1+\exp\left(-2\times\frac{G_{(x,y)}(0)}{G\_slope_{(x,y)}^i}\right)} - 1\right]}{\left[\frac{2}{1+\exp\left(-2\times\frac{255}{G\_slope_{(x,y)}^i}\right)} - 1\right]} \quad (7b)$$

$$B_{(x,y)}(1) = \frac{255}{3} \sum_{i=1}^{3} \frac{\left[\frac{2}{1+\exp\left(-2\times\frac{B_{(x,y)}(0)}{B\_slope_{(x,y)}^i}\right)} - 1\right]}{\left[\frac{2}{1+\exp\left(-2\times\frac{255}{B\_slope_{(x,y)}^i}\right)} - 1\right]} \quad (7c)$$

where $R\_slope_{(x,y)}^i$ is the control parameter of the enhancement function of the $i^{th}$ composite function of the red component of the $x^{th}$ row and $y^{th}$ column at the $0^{th}$ iteration. $G\_slope_{(x,y)}^i$ is the control parameter of the enhancement function of the $i^{th}$ composite function of the green component of the $x^{th}$ row and $y^{th}$ column at the $0^{th}$ iteration. $B\_slope^{(x,y)i}$ is the control parameter of the enhancement function of the $i^{th}$ composite function of the blue component of the $x^{th}$ row and $y^{th}$ column at the $0^{th}$ iteration.

$$R\_slope_{(x,y)}^i = (255 - k_5^i)\left[\frac{(R\_gain_{(x,y)}^i \times F_{R_{(x,y)}}^i)^{k_6^i}}{255^{k_6^i}}\right] + k_5^i \quad (8a)$$

$$G\_slope_{(x,y)}^i = (255 - k_7^i)\left[\frac{(G\_gain_{(x,y)}^i \times F_{G_{(x,y)}}^i)^{k_8^i}}{255^{k_8^i}}\right] + k_7^i \quad (8b)$$

$$B\_slope_{(x,y)}^i = (255 - k_9^i)\left[\frac{(B\_gain_{(x,y)}^i \times F_{B_{(x,y)}}^i)^{k_{10}^i}}{255^{k_{10}^i}}\right] + k_9^i \quad (8c)$$

where $k_5^i$, $k_7^i$, and $k_9^i$ are the shifting constants of the $i^{th}$ composite function of the red component, green component, and blue component of the image respectively. $k_6^i$, $k_8^i$, and $k_{10}^i$ are the power constant in the $i^{th}$ composite function of the red component, green component, and blue component of the image respectively. $F_{R_{(x,y)}}^i$ is the low pass filtered image (the original image convolved with a Gaussian filter) of the red component of the $x^{th}$ row and $y^{th}$ column of the $i^{th}$ composite function. $F_{G_{(x,y)}}^i$ is the low pass filtered image (the original image convolved with a Gaussian filter) of the green component of the $x^{th}$ row and $y^{th}$ column of the $i^{th}$ composite function. $F_{B_{(x,y)}}^i$ is the low pass filtered image (the original image convolved with a Gaussian filter) of the blue component of the $x^{th}$ row and $y^{th}$ column of the $i^{th}$ composite function. $R\_gain_{(x,y)}^i$ is the gain factor of the red component of the $x^{th}$ row and $y^{th}$ column at the $i^{th}$ composite function. $G\_gain_{(x,y)}^i$ is the gain factor of the green component of the $x^{th}$ row and $y^{th}$ column at the $i^{th}$ composite function. $B\_gain_{(x,y)}^i$ is the gain factor of the blue component of the $x^{th}$ row and $y^{th}$ column at the $i^{th}$ composite function.

$$R\_gain_{(x,y)}^i = \left(\frac{F_{R_{(x,y)}}^i}{R_{(x,y)}}\right)^{k_{11}^i} \quad (9a)$$

$$G\_gain_{(x,y)}^i = \left(\frac{F_{G_{(x,y)}}^i}{G_{(x,y)}}\right)^{k_{12}^i} \quad (9b)$$

$$B\_gain_{(x,y)}^i = \left(\frac{F_{B_{(x,y)}}^i}{B_{(x,y)}}\right)^{k_{13}^i} \quad (9c)$$

where $k_{11}^i$, $k_{12}^i$, and $k_{13}^i$ are the power constants of the $i^{th}$ composite function of the red component, green component, and blue component of the image respectively.

$$\begin{pmatrix} R_{x,y}(t+1) \\ G_{x,y}(t+1) \\ B_{x,y}(t+1) \end{pmatrix} = \frac{1}{2} \begin{pmatrix} 0 & \frac{R_{x,y}(0)}{G_{x,y}(0)} & \frac{R_{x,y}(0)}{B_{x,y}(0)} \\ \frac{G_{x,y}(0)}{R_{x,y}(0)} & 0 & \frac{G_{x,y}(0)}{B_{x,y}(0)} \\ \frac{B_{x,y}(0)}{R_{x,y}(0)} & \frac{B_{x,y}(0)}{G_{x,y}(0)} & 0 \end{pmatrix} \times \begin{pmatrix} R_{x,y}(t) \\ G_{x,y}(t) \\ B_{x,y}(t) \end{pmatrix} \quad (10)$$

where $R_{x,y}(t+1)$, $G_{x,y}(t+1)$ and $B_{x,y}(t+1)$ are the color intensities R, G and B of the red component, green component and blue component, respectively, of the digital image at the $x^{th}$ row, $y^{th}$ column at the $(t+1)^{th}$ iteration; and $R_{x,y}(t)$, $G_{x,y}(t)$ and $B_{x,y}(t)$ are the color intensities R, G and B of the red component, green component and blue component, respectively, of the digital image at an $x^{th}$ row, $y^{th}$ column at a $t^{th}$ iteration.

DETAILED DESCRIPTION OF THE PREFERRED EMBODIMENT

The following detailed description is of the best presently contemplated modes of carrying out the invention. This description is not to be taken in a limiting sense, but is made merely for the purpose of illustrating general principles of embodiments of the invention.

The present invention provides a fast and novel approach for enhancing digital images by means of color image characterization, enhancement and balancing process in the spatial domain. This procedure provides an enhanced image, which is natural in appearance and has sharp visibility to human observation. This new technique is fast enough to provide a real time enhancement of images from a video stream. This new technique can be used for video surveillance applications such as processing image/video in a low lighting environment.

The method consists of three steps: color characterization; enhancement; and balancing. The characterization and balancing process is based on a novel ratio rule which is an unsupervised learning algorithm that does not required any external teacher. It can act as part of an image enhancement process that processes each pixel of the image. The characterization is done by modeling the relationship of the R, G, and B components of a pixel as prescribed by equation (5). The enhancement is done using equations (7)-(9). The balancing process is done by utilizing equation (10).

FIG. 1 shows the process of the digital image enhancement. The characterization process utilizes the ratio rule. Basically, the ratio rule is an unsupervised learning algorithm that does not require any external teacher. It can be used for image enhancement that processes each pixel of the image. In the first step of the enhancement, the relationship of the RGB components of a pixel is modeled (or computed) by using equations (1) and (5).

Figure 2:
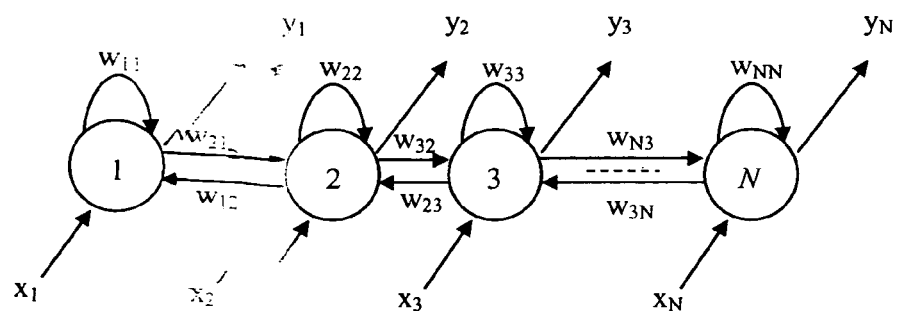
FIG. 2 shows the architecture of the ratio rule.
Figure 3:
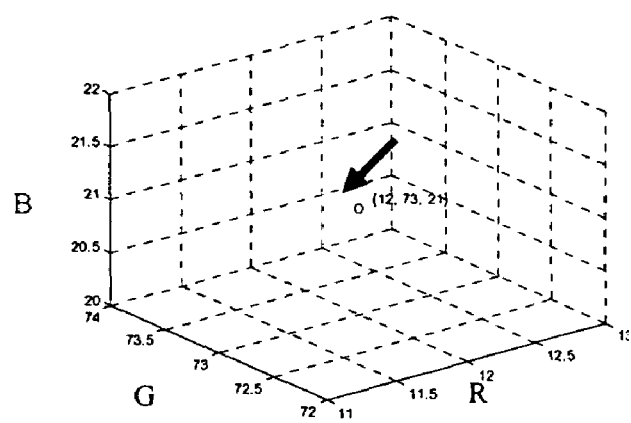
FIG. 3 shows a pixel in the RGB color space.
Figure 4:
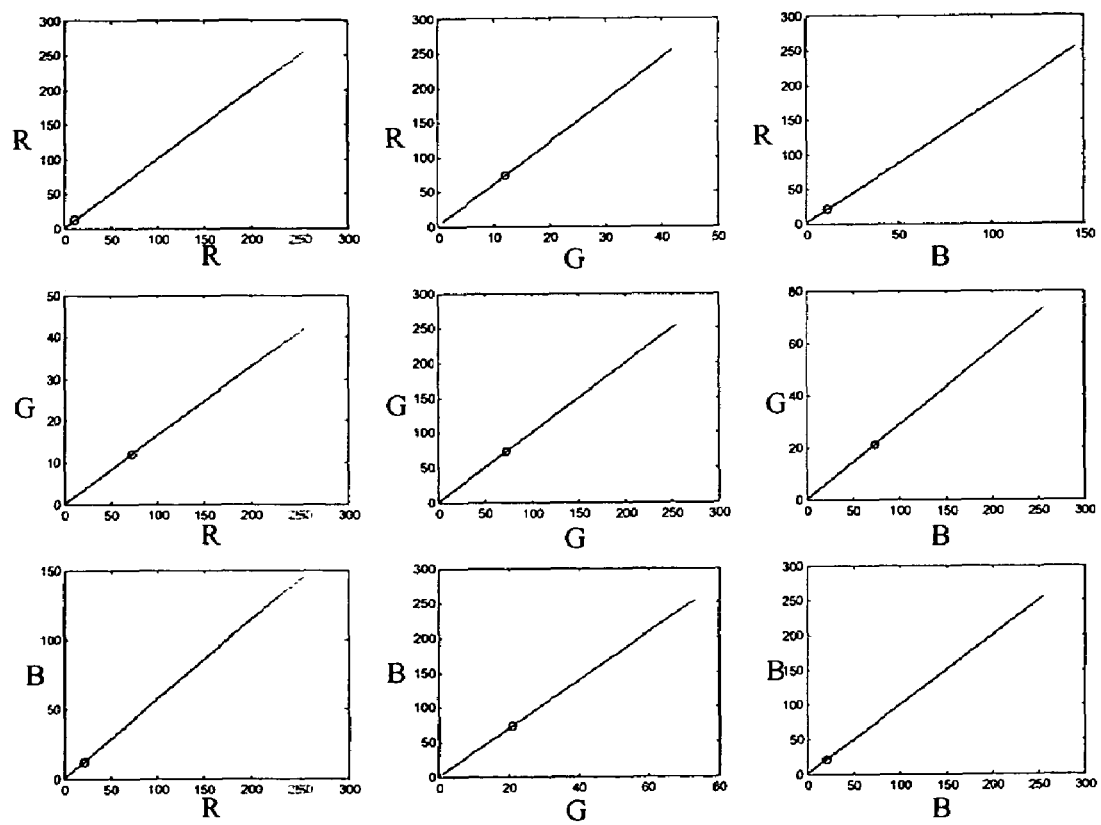
FIG. 4 shows the characterization process in which the ratio rule learns the relationship of each color component with respect to another color component.

The term $w_{ij}$ (equation (4)) represents the ratio between the state values of two neurons. This ratio finds the degree of similarity (or dissimilarity) between each neuron with other neurons. The network architecture is a single layer fully connected recurrent neural network as shown in FIG. 2. The output of the network is computed recursively using equations (3) and (10) until the network becomes stable. For instance, FIG. 3 shows the RGB components of a pixel at a particular image location $I(x,y)$. FIG. 4 shows the relationship between the R-R, R-G, R-B, G-R, G-G G-B, B-R, B-G, and B-B components of a pixel using the ratio rule from equation (5). It can be seen that the ratio rule can encapsulate the meaning (or relationship) of a pixel by describing its components (R, G, and B) as a linear transfer function. That is, no matter how the pixel changes its value, the relationship between them is always described.

Step two of the enhancement process involves utilizing equations (7)-(9) (see also equations (2) and (6)), to enhance the darker part of the image while preserving the brighter part of the image using equations (7a) to (7c) in which $R_{(x,y)}(1)$, $G_{(x,y)}(1)$, $B_{(x,y)}(1)$ are the enhanced pixel of the red component, green component, blue component respectively of the $x^{th}$ row $y^{th}$ column. They are computed by merging three composite (or scale, i.e $i=1$, $i=2$, $i=3$,) normalized hyperbolic functions based on $R\_slope_{(x,y)}{}^i$, $G\_slope_{(x,y)}{}^i$, and $B\_slope_{(x,y)}{}^i$ for better dynamic range compression and tonal rendition.

Figure 5:
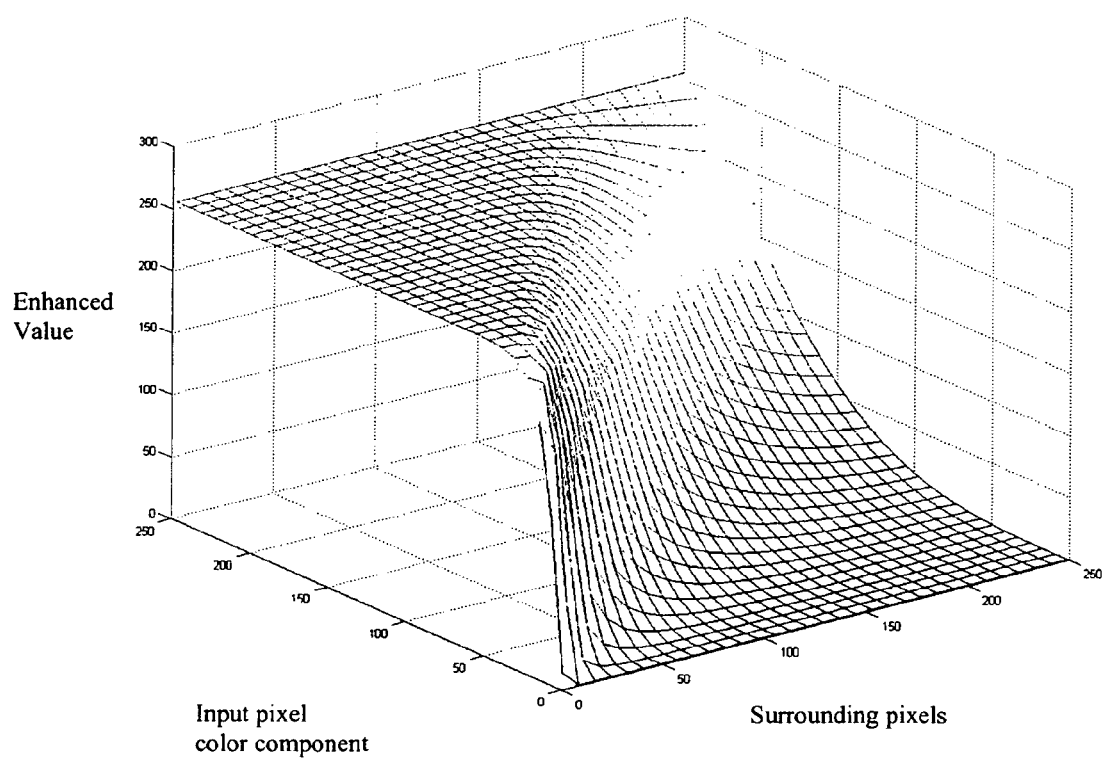
FIG. 5 shows the enhancement process using equations 7(a)-(c)

FIG. 5 shows an illustration based on the $i^{th}$ composite function as shown in equation (7). The $R\_slope_{(x,y)}{}^i$, $G\_slope_{(x,y)}{}^i$, and $B\_slope_{(x,y)}{}^i$ control how much the red component, green component, and blue component of the pixel respectively of the $x^{th}$ row $y^{th}$ column should be increased or decreased. A smaller slope factor would yield a brighter pixel whereas a larger slope factor would yield a darker pixel.

Figure 6:
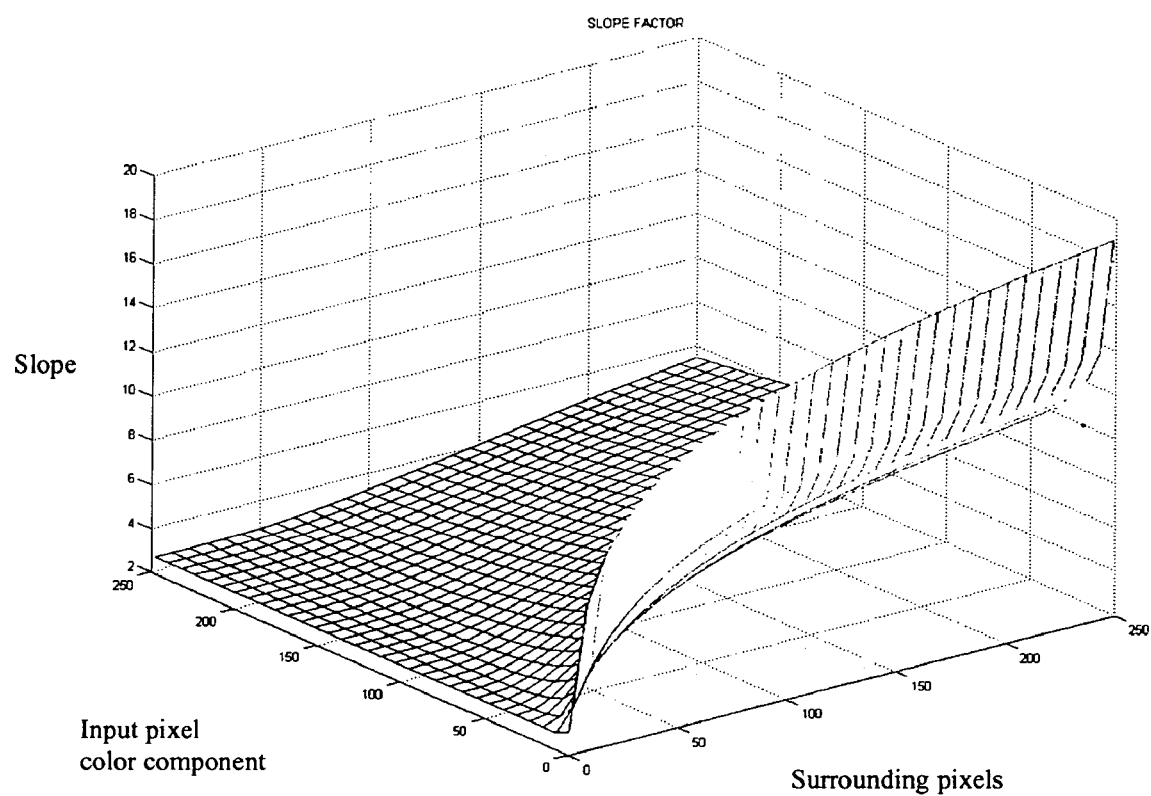
FIG. 6 shows the slope factor in equations 8(a)-(c)

$R\_slope_{(x,y)}{}^i$, $G\_slope_{(x,y)}{}^i$, and $B\_slope_{(x,y)}{}^i$ are computed using equations (8a) to (8c) in which $R\_gain_{(x,y)}{}^i$, $G\_gain_{(x,y)}{}^i$, and $B\_gain_{(x,y)}{}^i$ control how much contrast is added to the enhanced pixel of the red component, green component, and blue component respectively of the $x^{th}$ row and $y^{th}$ column. $F_{R_{(x,y)}}{}^i$, $F_{G_{(x,y)}}{}^i$, and $F_{B_{(x,y)}}{}^i$ is the low pass filtered image (the original image convolved with a Gaussian filter). $k_5{}^i$, $k_7{}^i$, and $k_9{}^i$ define how small the slope function can be in the $i^{th}$ composite function. $k_6{}^i$, $k_8{}^i$, and $k_{10}{}^i$ define the power constants of the red component, green component, and blue component respectively. Notice that when the low pass filtered image has a smaller pixel value, depending on the gain factor, shifting constant and power constant, the pixel value will be increased because the slope factor is small. On the other hand, if the low pass filtered image has a high pixel value, depending on the gain factor, shifting constant and power constant, the slope factor will be high. As a result, the pixel value will be reduced. FIG. 6 shows an illustration of the slope factor.

Figure 7:
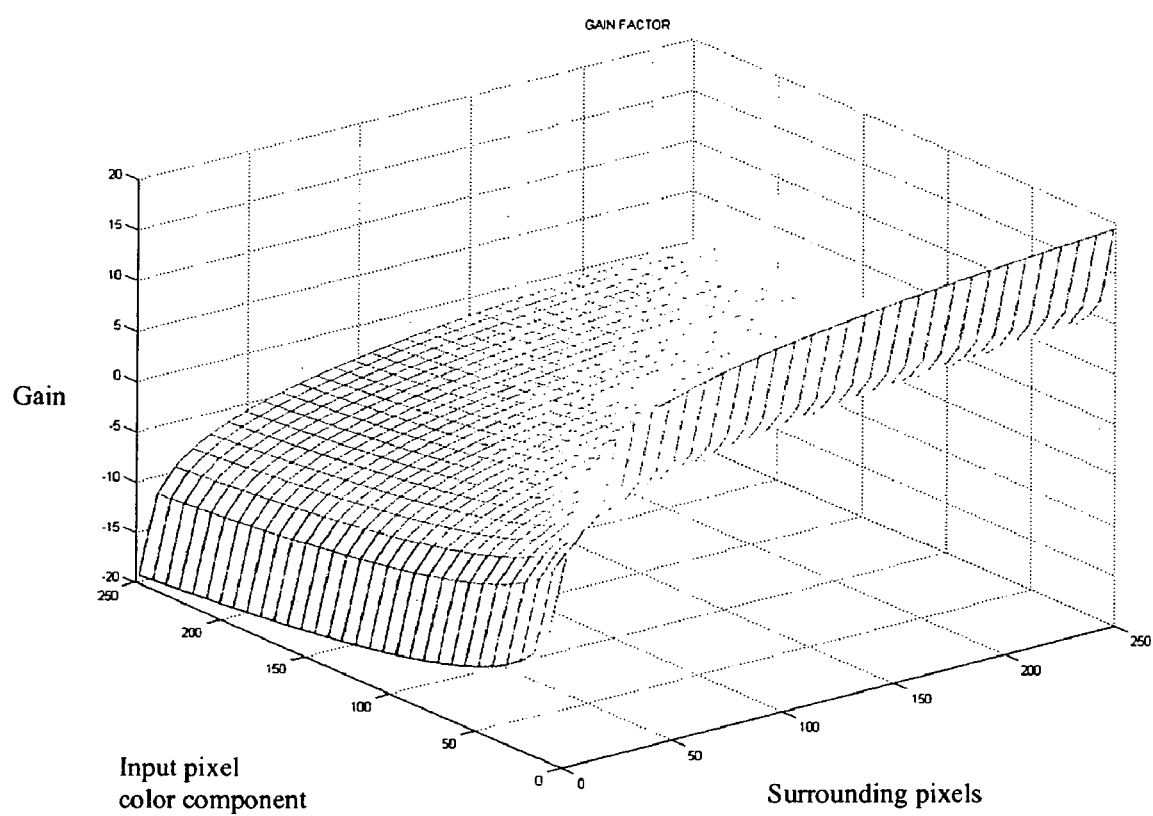
FIG. 7 shows the gain factor in equations 9(a)-(c)

$R\_gain_{(x,y)}{}^i$, $G\_gain_{(x,y)}{}^i$, and $B\_gain_{(x,y)}{}^i$ are computed using equation (9a) to (9c). The gain factors—$R\_gain_{(x,y)}{}^i$, $G\_gain_{(x,y)}{}^i$ and, $B\_gain_{(x,y)}{}^i$ calculate how much contrast should be included in the enhancement. They are computed by taking a power of the ratio between the color components of a pixel ($R_{(x,y)}$, $G_{(x,y)}$, and $B_{(x,y)}$) and its environment ($F_{R_{(x,y)}}{}^i$, $F_{G_{(x,y)}}{}^i$, and $F_{B_{(x,y)}}{}^i$) at different $i^{th}$ scale. For example, if surrounding pixels ($F_{R_{(x,y)}}{}^i$, $F_{G_{(x,y)}}{}^i$, and $F_{B_{(x,y)}}{}^i$) are darker than the pixel under consideration ($R_{(x,y)}$, $G_{(x,y)}$, and $B_{(x,y)}$), the gain factor ($R\_gain_{(x,y)}{}^i$, $G\_gain_{(x,y)}{}^i$, and $B\_gain_{(x,y)}{}^i$) will be less than one. If the power ($k_{11}{}^i$, $k_{12}{}^i$, and $k_{13}{}^i$) is greater than one, the gain factor will become smaller. As a consequence, the slope factors ($R\_slope_{(x,y)}{}^i$, $G\_slope_{(x,y)}{}^i$, and $B\_slope_{(x,y)}{}^i$), which control the brightness of the pixel, will become smaller and the pixel will become brighter as the result of the normalized hyperbolic tangent function, thus increasing the contrast between the pixel and the surrounded pixels. On the other hand, if surrounding pixels ($F_{R_{(x,y)}}{}^i$, $F_{G_{(x,y)}}{}^i$, and $F_{B_{(x,y)}}{}^i$) are brighter than the pixel under consideration ($R_{(x,y)}$, $G_{(x,y)}$, and $B_{(x,y)}$), the gain factor ($R\_gain_{(x,y)}{}^i$, $G\_gain_{(x,y)}{}^i$, and $B\_gain_{(x,y)}{}^i$) will be greater than one. If the power ($k_{11}{}^i$, $k_{12}{}^i$ and $k_{13}{}^i$) is greater than one, the gain factor will become bigger. As a result, the slope factor ($R\_slope_{(x,y)}{}^i$, $G\_slope_{(x,y)}{}^i$, and $B\_slope_{(x,y)}{}^i$) will become bigger and the pixel will become darker as a result of the hyperbolic tangent function. FIG. 7 shows an illustration of the gain factor.

Figure 8:
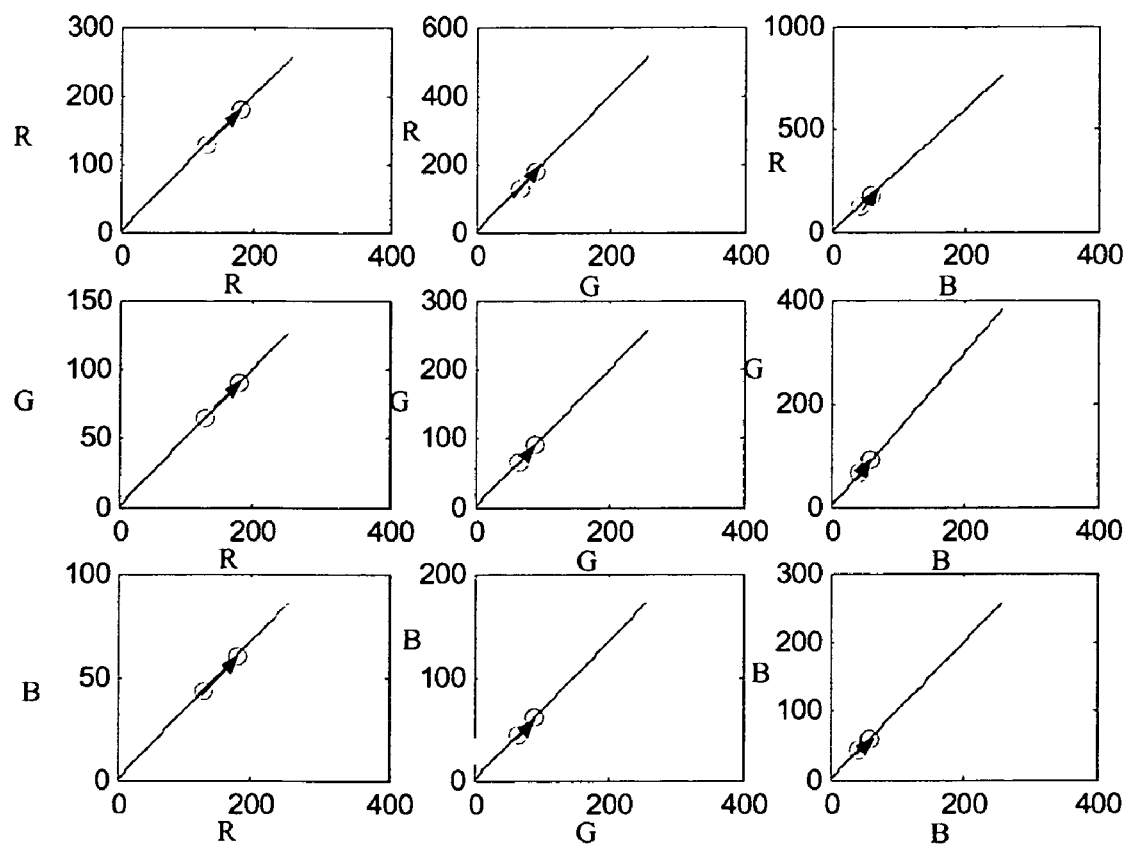
FIG. 8 shows the balancing process using equation 10.

For step three, since the relationship of the RGB component of a pixel is offset by equations (7)-(9), the relationship between RGB components of the image can be retuned using equation (10). That is, although the pixel has a higher intensity, the relationship of the R, G, and B components of the image is still preserved. FIG. 8 shows the retuning of a pixel using the ratio rule learning algorithm.

Figure 9:
FIG. 9 shows the enhancement result of an image in unbalanced lighting environment.
Figure 9:
Figure 10:
FIG. 10 shows the enhancement result of an image in low lighting environment.
Figure 10:
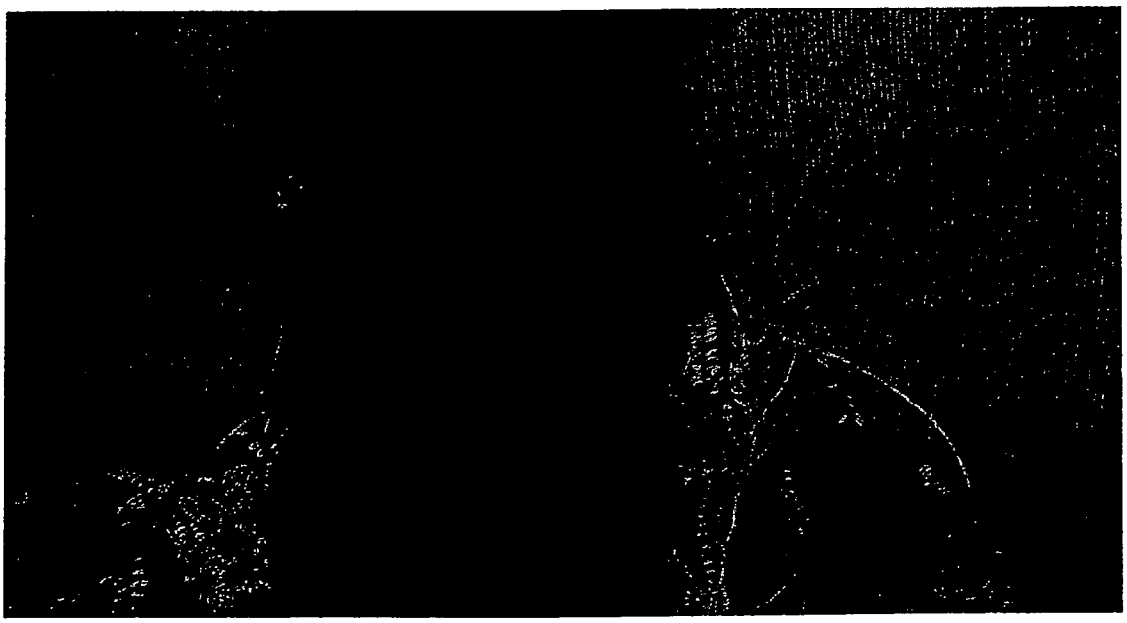

FIG. 9 shows the result of an image in an unbalanced lighting environment. It can be seen that the proposed enhancement algorithm can correct those unbalanced lighting variations in the environment but preserve the brighter part of the image. FIG. 10 shows the results of an image in a dark lighting environment. It can be observed that the enhancement process is able to enhance and produce a visually sharp image.

Many improvements, modifications, and additions will be apparent to the skilled artisan without departing from the spirit and scope of the present invention as described herein and defined in the following claims.

What is claimed is:

1. A method for improving a digital image, comprising:
providing a digital image consisting of a plurality of pixels;
characterizing the relationship between the red, green and blue components of at least one pixel using the ratio rule;
enhancing the image by increasing the intensity of at least one darker pixel of the image; and
balancing the enhanced image based on returning the intensity of the red, green and blue components of the at least one pixel to the relationship determined in said characterization of the relationship between the red, green and blue components of the at least one pixel.

2. The method as set forth in claim 1 wherein the relationship between the red, green and blue components of the at least one pixel is calculated using the equation:

$$W = \begin{pmatrix} w_{11} & w_{12} & w_{13} \\ w_{21} & w_{22} & w_{23} \\ w_{31} & w_{32} & w_{33} \end{pmatrix}$$

where $w_{ij}$ is a relationship between a $i^{th}$ color component with respect to a $j^{th}$ color component.

3. The method as set forth in claim 2 wherein the relationship between the red, green and blue components of the at least one pixel is $$w_{ij} = f(i,j).$$

4. The method as set forth in claim 3 wherein the characterizing of the relationship between the red, green and blue components of the at least one pixel is calculated by:

$$W = \begin{pmatrix} 0 & \frac{R_{x,y}(0)}{G_{x,y}(0)} & \frac{R_{x,y}(0)}{B_{x,y}(0)} \\ \frac{G_{x,y}(0)}{R_{x,y}(0)} & 0 & \frac{G_{x,y}(0)}{B_{x,y}(0)} \\ \frac{B_{x,y}(0)}{R_{x,y}(0)} & \frac{B_{x,y}(0)}{G_{x,y}(0)} & 0 \end{pmatrix}.$$

5. The method as set forth in claim 2 wherein the enhanced digital image is balanced according to $$I_{x,y}(t+1) = \frac{W \times I_{x,y}(t)}{2} \quad \text{for } 1 \le t < \infty$$

where $I_{x,y}(t+1)$ is a color intensity I at an $x^{th}$ row, $y^{th}$ column at a $(t+1)^{th}$ iteration and $I_{x,y}(t)$ is a color intensity I at an $x^{th}$ row, $y^{th}$ column at a $t^{th}$ iteration.

6. The method as set forth in claim 4 wherein the enhanced digital image is balanced according to $$\begin{pmatrix} R_{x,y}(t+1) \\ G_{x,y}(t+1) \\ B_{x,y}(t+1) \end{pmatrix} = \frac{1}{2} \begin{pmatrix} 0 & \frac{R_{x,y}(0)}{G_{x,y}(0)} & \frac{R_{x,y}(0)}{B_{x,y}(0)} \\ \frac{G_{x,y}(0)}{R_{x,y}(0)} & 0 & \frac{G_{x,y}(0)}{B_{x,y}(0)} \\ \frac{B_{x,y}(0)}{R_{x,y}(0)} & \frac{B_{x,y}(0)}{G_{x,y}(0)} & 0 \end{pmatrix} \times \begin{pmatrix} R_{x,y}(t) \\ G_{x,y}(t) \\ B_{x,y}(t) \end{pmatrix}$$

where $R_{x,y}(t+1)$ is a color intensity R of the red component of the digital image at an $x^{th}$ row, $y^{th}$ column at a $(t+1)^{th}$ iteration; $G_{x,y}(t+1)$ is a color intensity G of the green component of the digital image at an $x^{th}$ row, $y^{th}$ column at a $(t+1)^{th}$ iteration; $B_{x,y}(t+1)$ is a color intensity B of the blue component of the digital image at an $x^{th}$ row, $y^{th}$ column at a $(t+1)^{th}$ iteration; $R_{x,y}(t)$ is a color intensity R of the red component of the digital image at an $x^{th}$ row, $y^{th}$ column at a $t^{th}$ iteration; $G_{x,y}(t)$ is a color intensity G of the green component of the digital image at an $x^{th}$ row, $y^{th}$ column at a $t^{th}$ iteration and $B_{x,y}(t)$ is a color intensity B of the blue component of the digital image at an $x^{th}$ row, $y^{th}$ column at a $t^{th}$ iteration.

7. The method as set forth in claim 1 wherein the digital image is enhanced in accordance with $$I_{(x,y)}(1) = T[I_{x,y}(0)]$$

where $I_{x,y}(0)$ is the red, green or blue component of the $x^{th}$ row $y^{th}$ column at a $0^{th}$ iteration, T is a transfer function of the red, green or blue component and $I_{(x,y)}(1)$ is the red, green or blue component of the $x^{th}$ row $y^{th}$ column after a first iteration.

8. The method as set forth in claim 7 wherein the digital image is enhanced in accordance with $$I_{x,y}(1) = \frac{k_1}{3} \sum_{i=1}^{3} \left[ \frac{k_2}{1 + \exp\left(-2k_3 \frac{I_{x,y}(0)}{\text{L\_slope}_{(x,y)}^i}\right)} + k_4 \right]$$

where $k_1, k_2, k_3, k_4$ are constants and $$\text{L\_slope}_{(x,y)}^i = (255 - k_s^i) \left[ \frac{(\text{L\_gain}_{(x,y)}^i \times F_{I_{(x,y)}}^i)^{k_p^i}}{255^{k_p^i}} \right] + k_s^i$$

where $k_s^i$ is a shifting constant of an $i^{th}$ composite function of the red, green and blue components of the digital image, $k_p^i$ is a power constant of an $i^{th}$ composite function of the red, green and blue components of the digital image, $F_{I_{(x,y)}}^i$ is a low pass filtered image of the red, green and blue component of the $x^{th}$ row and $y^{th}$ column of an $i^{th}$ composite function, $\text{I\_gain}_{(x,y)}^i$ is a gain factor of the red, green and blue component of the $x^{th}$ row and $y^{th}$ column at the $i^{th}$ composite function.

9. The method as set forth in claim 8 wherein $$I\_gain_{(x,y)}^i = \left(\frac{F_{I_{(x,y)}}^i}{I_{(x,y)}}\right)^{k_p^i}.$$

10. The method as set forth in claim 1 wherein the digital image is enhanced in accordance with $$R_{(x,y)}(1) = T_R[R_{(x,y)}(0)]$$

$$G_{(x,y)}(1) = T_G[G_{(x,y)}(0)]$$

$$B_{(x,y)}(1) = T_B[B_{(x,y)}(0)]$$

where $R_{(x,y)}(0)$ is the red component of the $x^{th}$ row $y^{th}$ column at a $0^{th}$ iteration, $G_{(x,y)}(0)$ is the green component of the $x^{th}$ row $y^{th}$ column at the $0^{th}$ iteration, $B_{(x,y)}(0)$ is the blue component of the $x^{th}$ row $y^{th}$ column at the $0^{th}$ iteration, $T_R[.]$ is a transfer function of the red component, $T_G[.]$ is a transfer function of the green component, $T_B[.]$ is a transfer function of the blue component, $R_{(x,y)}(1)$ is the red component of the $x^{th}$ row $y^{th}$ column after a first iteration, $G_{(x,y)}(1)$ is the green component of the $x^{th}$ row $y^{th}$ column after a first iteration and $B_{(x,y)}(1)$ is the blue component of the $x^{th}$ row $y^{th}$ column after a first iteration.

11. The method as set forth in claim 10 wherein the digital image is enhanced in accordance with $$R_{(x,y)}(1) = \frac{255}{3}\sum_{i=1}^{3}\left[\frac{\dfrac{2}{1+\exp\left(-2\times\dfrac{R_{(x,y)}(0)}{R\_slope_{(x,y)}^i}\right)} - 1}{\dfrac{2}{1+\exp\left(-2\times\dfrac{255}{R\_slope_{(x,y)}^i}\right)} - 1}\right]$$

$$G_{(x,y)}(1) = \frac{255}{3}\sum_{i=1}^{3}\left[\frac{\dfrac{2}{1+\exp\left(-2\times\dfrac{G_{(x,y)}(0)}{G\_slope_{(x,y)}^i}\right)} - 1}{\dfrac{2}{1+\exp\left(-2\times\dfrac{255}{G\_slope_{(x,y)}^i}\right)} - 1}\right]$$

$$B_{(x,y)}(1) = \frac{255}{3}\sum_{i=1}^{3}\left[\frac{\dfrac{2}{1+\exp\left(-2\times\dfrac{B_{(x,y)}(0)}{B\_slope_{(x,y)}^i}\right)} - 1}{\dfrac{2}{1+\exp\left(-2\times\dfrac{255}{B\_slope_{(x,y)}^i}\right)} - 1}\right]$$

where $R\_slope_{(x,y)}^i$ is a control parameter of the enhancement function of an $i^{th}$ composite function of the red component of the $x^{th}$ row and $y^{th}$ column at the $0^{th}$ iteration, $G\_slope_{(x,y)}^i$ is a control parameter of the enhancement function of an $i^{th}$ composite function of the green component of the $x^{th}$ row and $y^{th}$ column at the $0^{th}$ iteration and $B\_slope^{(x,y)i}$ is a control parameter of the enhancement function of an $i^{th}$ composite function of the blue component of the $x^{th}$ row and $y^{th}$ column at the $0^{th}$ iteration.

12. The method as set forth in claim 11 wherein $$R\_slope_{(x,y)}^i = (255 - k_5^i)\left[\frac{(R\_gain_{(x,y)}^i \times F_{R_{(x,y)}}^i)^{k_6^i}}{255^{k_6^i}}\right] + k_5^i$$

$$G\_slope_{(x,y)}^i = (255 - k_7^i)\left[\frac{(G\_gain_{(x,y)}^i \times F_{G_{(x,y)}}^i)^{k_8^i}}{255^{k_8^i}}\right] + k_7^i$$

$$B\_slope_{(x,y)}^i = (255 - k_9^i)\left[\frac{(B\_gain_{(x,y)}^i \times F_{B_{(x,y)}}^i)^{k_{10}^i}}{255^{k_{10}^i}}\right] + k_9^i$$

where $k_5^i$, $k_7^i$, and $k_9^i$ are shifting constants of the $i^{th}$ composite function of the red component, green component, and blue component of the image respectively; $k_6^i$, $k_8^i$, and $k_{10}^i$ are power constants in the $i^{th}$ composite function of the red component, green component, and blue component of the digital image respectively; $F_{R_{(x,y)}}^i$ is a low pass filtered image of the red component of the $x^{th}$ row and $y^{th}$ column of the $i^{th}$ composite function; $F_{G_{(x,y)}}^i$ is a low pass filtered image of the green component of the $x^{th}$ row and $y^{th}$ column of the $i^{th}$ composite function; $F_{B_{(x,y)}}^i$ is a low pass filtered image of the blue component of the $x^{th}$ row and $y^{th}$ column of the $i^{th}$ composite function; $R\_gain_{(x,y)}^i$ is a gain factor of the red component of the $x^{th}$ row and $y^{th}$ column at the $i^{th}$ composite function; $G\_gain_{(x,y)}^i$ is a gain factor of the green component of the $x^{th}$ row and $y^{th}$ column at the $i^{th}$ composite function; and $B\_gain_{(x,y)}^i$ is a gain factor of the blue component of the $x^{th}$ row and $y^{th}$ column at the $i^{th}$ composite function.

13. The method as set forth in claim 12 wherein $$R\_gain_{(x,y)}^i = \left(\frac{F_{R_{(x,y)}}^i}{R_{(x,y)}}\right)^{k_{11}^i}$$

$$G\_gain_{(x,y)}^i = \left(\frac{F_{G_{(x,y)}}^i}{G_{(x,y)}}\right)^{k_{12}^i}$$

$$B\_gain_{(x,y)}^i = \left(\frac{F_{B_{(x,y)}}^i}{B_{(x,y)}}\right)^{k_{13}^i}$$

where $k_{11}^i$, $k_{12}^i$, and $k_{13}^i$ are power constants of the $i^{th}$ composite function of the red component, green component and blue component of the digital image respectively.

* * * * *